United States Patent [19]
Ruckdeschel et al.

[11] Patent Number: 6,062,591
[45] Date of Patent: May 16, 2000

[54] GAS BAG MODULE FOR A VEHICLE OCCUPANT RESTRAINT SYSTEM

[75] Inventors: Rolf Ruckdeschel, Schwangau; Werner Müller, Mühldorf/Inn, both of Germany

[73] Assignee: TRW Airbag Systems GmbH & Co., KG, Aschau am Inn, Germany

[21] Appl. No.: 09/096,150

[22] Filed: Jun. 11, 1998

[30] Foreign Application Priority Data

Jun. 12, 1997 [DE] Germany .......................... 197 24 896

[51] Int. Cl.⁷ ................................................. B60R 21/16
[52] U.S. Cl. ...................................... 280/728.2; 280/740
[58] Field of Search .................... 280/736, 741, 280/737, 742, 740, 728.2

[56] References Cited

U.S. PATENT DOCUMENTS

| | | | |
|---|---|---|---|
| 4,178,017 | 12/1979 | Ishi et al. ................................. | 280/740 |
| 4,810,005 | 3/1989 | Fohl . | |
| 5,176,400 | 1/1993 | McGuire et al. . | |
| 5,195,774 | 3/1993 | Morita ..................................... | 280/731 |
| 5,511,818 | 4/1996 | Jarboe, et al. . | |
| 5,577,763 | 11/1996 | Guevas . | |
| 5,613,704 | 3/1997 | White, Jr. et al. . | |
| 5,884,939 | 3/1999 | Yamaji et al. ....................... | 280/743.1 |

FOREIGN PATENT DOCUMENTS

| | | |
|---|---|---|
| 19704335 | of 0000 | Germany . |
| 2824701 | of 0000 | Germany . |
| 29605585 | of 0000 | Germany . |
| 29606322 | of 0000 | Germany . |
| 4414743 | of 0000 | Germany . |
| 29606830 | 8/1996 | Germany . |

*Primary Examiner*—Paul N. Dickson
*Attorney, Agent, or Firm*—Tarolli, Sundheim, Covell, Tummino & Szabo L.L.P.

[57] ABSTRACT

In a gas bag module for a vehicle occupant restraint system, a gas generator is held on a trough-shaped carrier part inbetween a diffusor cap, surrounding it, and the base of the carrier part by means of a clamping ring, by which the rim of the inflation opening of a gas bag is fastened to the carrier part.

2 Claims, 1 Drawing Sheet

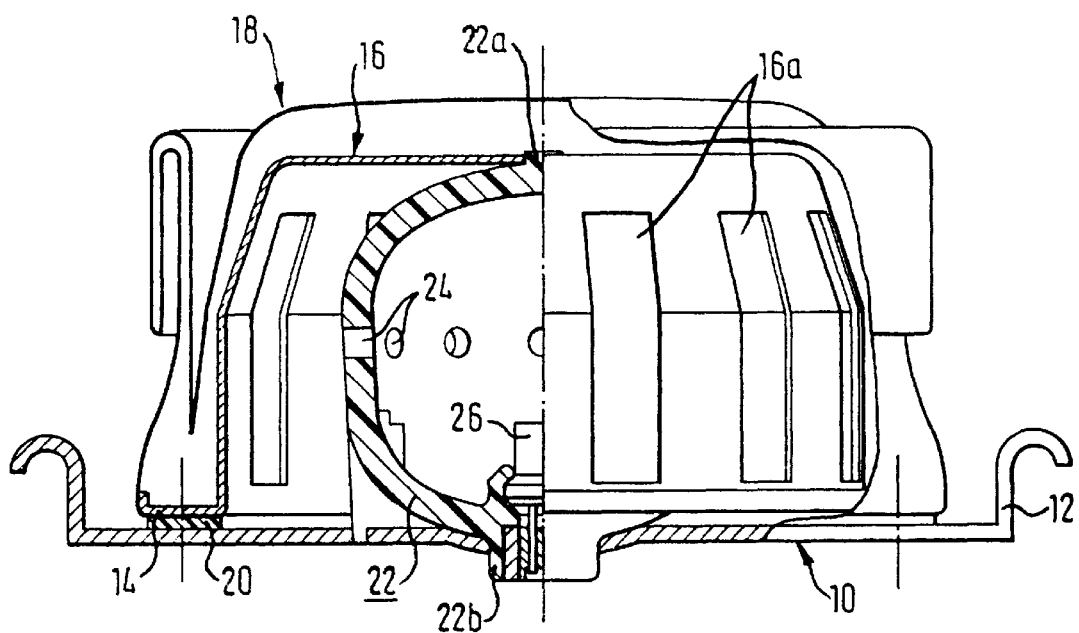

GAS BAG MODULE FOR A VEHICLE OCCUPANT RESTRAINT SYSTEM

FIELD OF THE INVENTION

The invention relates to a gas bag module for a vehicle occupant restraint system, with a trough-shaped carrier part, a gas generator fastened thereto and with a clamping ring by which the rim of the inflation opening of the gas bag is secured to the carrier part.

BACKGROUND OF THE INVENTION

A gas bag module of this type of construction is particularly suitable for integration into a vehicle steering wheel. The vehicle steering wheel is provided with a hub to accommodate the gas bag module, the dimensions of which hub are substantially determined by the dimensions of the gas bag module.

SUMMARY OF THE INVENTION

The invention provides a gas bag module which is constructed so as to be particularly compact and can therefore be easily integrated into a vehicle steering wheel. According to the invention, the gas generator is held between a diffusor cap, surrounding it, and the base of the trough-shaped carrier part. Due to this design, no separate components such as fastening flanges or the like, which would need additional construction space, are required to fasten the gas generator to the carrier part. Preferably, the gas generator is clamped inbetween the diffusor cap and the base of the carrier part, whereby an immobile attachment of the gas generator is achieved.

In the preferred embodiment of the gas bag module, the diffusor cap is constructed in one piece with the clamping ring, by which the rim of the inflation opening of the gas bag is secured to the carrier part. Therefore, only the clamping ring has to be fastened to the carrier part in order to fasten the gas bag, the diffusor cap and also the gas generator housing to the carrier part. The installation of the gas bag module is greatly simplified due to this construction. The dismantling of the gas bag module, which is necessary for recycling, is also correspondingly simplified.

Further features and advantages of the invention read from the following description of a preferred embodiment and from the drawing to which reference is made.

BRIEF DESCRIPTION OF THE DRAWINGS

The single FIGURE shows a diagrammatic illustration, partially in section, of the gas bag module according to the invention.

DESCRIPTION OF THE PREFERRED EMBODIMENT

The gas bag module has a generally trough-shaped carrier part 10. The fastening of the trough-shaped carrier part 10 to the steering wheel is not illustrated. The rim of the inflation opening of a gas bag 18 is fastened to the carrier part 10 by means of a clamping ring 14, which is constructed in one piece with a diffusor cap 16, with possible insertion of a sealing ring 20. A gas generator 22 is arranged inbetween the diffusor cap 16 and the base of the carrier part 10, which gas generator 22 has a generally rotationally symmetrical housing with a row of outlet openings 24 in its peripheral wall. On the side of the diffusor cap 16, the housing of the gas generator 22 is integrally provided with a cylindrical pin 22a which engages a corresponding opening of the diffusor cap 16 with an interlocking fit. On the opposite side, adjacent to the carrier part 10, a socket 22b is integrally formed on the housing of the gas generator 22, which socket 22b is inserted with an interlocking fit into a corresponding opening at the base of the carrier part 10. The wall region surrounding the socket 22b on the base of the carrier part 10 is constructed in a concave shape and is in snug contact with the wall of the gas generator housing. The electrical connections of an igniter 26 arranged inside the gas generator 22 are lead through the socket 22b to the outside. The remaining interior of the gas generator 22 is filled with gas generator material (not shown).

With respect to the outlet openings 24 of the gas generator 22, the diffusor cap 16 is spaced apart therefrom in the radial direction and is provided with diffusor slits 16a which are uniformly distributed over the periphery of its barrel surface.

The gas bag 18 is maintained in the folded state by means of a cover (not shown), which is fastened for example to the peripheral rim 12 integrally formed on the carrier part 10.

The connection of the gas generator 22 to the gas bag module, as illustrated, is advantageous from several points of view. As the housing of the gas generator 22 is clamped and held inbetween the diffusor cap 16 and the base of the carrier pat 10 with an interlocking fit, no separate fastening parts are required. The diffusor cap 16 is fastened with the clamping ring 14 to the carrier part 10, for example by means of screws, whereby at the same time the securing of the gas generator and the connecting of the gas bag 18 is effected. As the gas generator 22 is arranged between the diffusor cap 16 and the carrier part 10, with only the socket 22b projecting beneath the base of the carrier part 10, it is protected from improper access. The gas bag module which is shown is particularly compact, especially in axial direction. Installation and dismantling are greatly simplified compared with conventional designs in which the gas generator and the diffusor are fastened to a carrier part separately from each other. Finally, the manufacturing costs and the weight of the gas bag module are reduced.

We claim:

1. A gas bag module for a vehicle occupant restraint system, comprising:

a trough-shaped carrier part with a base, a gas generator, a gas bag with a rim forming an inflation opening, a clamping ring, and a diffuser cap surrounding said gas generator, wherein said clamping ring secures said rim forming said inflation opening to said carrier part and said gas generator is held between said diffuser cap and said base of said carrier part, wherein said gas generator is held between said diffuser cap and said base of said carrier part with an interlocking fit, and wherein said gas generator has a housing with at least one integrally formed pin and an integrally formed socket, said diffuser cap forms a first opening and said base of said carrier part forms a second opening, said pin of said housing fitting in said first opening and said socket of said housing being constructed so as to adapt to said second opening.

2. The gas bag module according to claim 1, wherein said opening at said base of said carrier part is rimmed by a concave wall region being in snug contact with said housing of said gas generator.

* * * * *